US009619553B2

(12) United States Patent
Galvin, Jr. et al.

(10) Patent No.: US 9,619,553 B2
(45) Date of Patent: Apr. 11, 2017

(54) RANKING OF MEETING TOPICS

(71) Applicant: International Business Machines Corporation, Armonk, NY (US)

(72) Inventors: James Patrick Galvin, Jr., Georgetown, KY (US); Amy D. Travis, Arlington, MA (US); Sara B. Weber, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/765,004

(22) Filed: Feb. 12, 2013

(65) Prior Publication Data

US 2014/0229471 A1   Aug. 14, 2014

(51) Int. Cl.
G06F 17/30 (2006.01)
G06F 15/16 (2006.01)

(52) U.S. Cl.
CPC .............................. G06F 17/3061 (2013.01)

(58) Field of Classification Search
CPC .......... G06F 17/30867; G06F 3/04817; G06F 17/30657; G06F 17/30864; G06F 17/3002; G06F 17/30029; G06F 17/30241; G06F 17/30292; G06F 17/30386; G06F 17/30424; G06F 17/3053; G06F 17/30613; G06F 17/30643; G06F 17/30702; G06F 17/3071
See application file for complete search history.

(56) References Cited

U.S. PATENT DOCUMENTS

| 7,945,854 B2 | 5/2011 | Medynskiy et al. |
| 8,190,999 B2 | 5/2012 | Chen et al. |
| 2004/0230651 A1* | 11/2004 | Ivashin .................... 709/204 |
| 2006/0247940 A1* | 11/2006 | Zhu et al. .................. 705/1 |
| 2008/0091692 A1* | 4/2008 | Keith et al. ................ 707/100 |
| 2008/0235018 A1 | 9/2008 | Eggen et al. |
| 2009/0271438 A1* | 10/2009 | Agapi et al. ............... 707/104.1 |
| 2009/0292526 A1 | 11/2009 | Harari et al. |
| 2010/0205541 A1* | 8/2010 | Rapaport et al. ........... 715/753 |
| 2011/0022967 A1* | 1/2011 | Vijayakumar et al. ....... 715/753 |
| 2011/0055264 A1* | 3/2011 | Sundelin ............ G06Q 10/107 707/776 |
| 2011/0161314 A1* | 6/2011 | Chunilal ..................... 707/723 |
| 2012/0005224 A1* | 1/2012 | Ahrens ................ G06Q 10/10 707/769 |
| 2014/0136506 A1* | 5/2014 | Ratner et al. ................ 707/706 |

OTHER PUBLICATIONS

Duchateau et al., "Integrating and Ranking Interests from User Profiles," Online Article, Centrum Wiskunde & Informatica Scientific Research Institute, http://oai.cwi.nl/oai/asset/16287/16287B.pdf, downloaded on Jan. 28, 2013; pp. 1-12.

* cited by examiner

*Primary Examiner* — Alex Gofman
(74) *Attorney, Agent, or Firm* — Brian J. Colandreo, Esq.; Jeffrey T. Placker, Esq.; Holland & Knight LLP

(57) ABSTRACT

A method, computer program product, and system for ranking meeting topics is described. A plurality of participants in an electronic meeting is identified. One or more interests associated with one or more individuals included in the plurality of participants are identified. One or more topics associated with the meeting are received. A ranking of the one or more topics is determined based upon, at least in part, the one or more identified interests.

11 Claims, 3 Drawing Sheets

RANKING OF MEETING TOPICS

TECHNICAL FIELD

This disclosure relates to electronic meetings.

BACKGROUND

In various situations, individuals and/or groups may participate in electronic meetings. Electronic meetings may be interactions among individuals facilitated by various electronic means. For example, electronic meeting applications may facilitate speech-, text-, and/or video-enabled communication sessions among a plurality of individuals. Voice recognition (and/or other means) may sometimes be employed with respect to a particular electronic meeting to identify topics of discussion in the meeting (e.g., by identifying words or phrases spoken by one or more meeting participants). For example, voice recognition applications may be utilized to generate a list of topic keywords that have been discussed during an electronic meeting.

BRIEF SUMMARY OF THE DISCLOSURE

According to one aspect of the disclosure, a computer-implemented method includes identifying, by one or more computing devices, a plurality of participants in an electronic meeting. The method includes identifying, by the one or more computing devices, one or more interest associated with one or more individuals included in the plurality of participants. The method includes receiving, by the one or more computing devices, one or more topics associated with the meeting. The method includes determining, by the one or more computing devices, a ranking of the one or more topics based upon, at least in part, the one or more identified interests.

One or more of the following features may be included. The method may include identifying a first set of interests associated with a first individual included in the plurality of participants. The method may include identifying a second set of interests associated with a second individual included in the plurality of participants. The method may include identifying a third set of common interests for the first individual and the second individual, based upon, at least in part, identifying an intersection of the first and second set of interests.

Identifying the one or more interests may be based upon, at least in part, one or more consumption activities associated with the one or more individuals. Identifying the one or more interests may be based upon, at least in part, profile information associated with the one or more individuals. Identifying the one or more interests may be based upon, at least in part, one or more social networking activities associated with the one or more individuals. Identifying the one or more interests may be based upon, at least in part, one or more publication activities associated with the one or more individuals. Identifying the one or more interests may be based upon, at least in part, chronological information associated with the one or more interests.

According to another aspect of the disclosure, a computer program product resides on a computer readable storage medium that has a plurality of instructions stored on it. When executed by a processor, the instructions cause a processor to perform operations including identifying a plurality of participants in an electronic meeting. The operations include identifying one or more interest associated with one or more individuals included in the plurality of participants. The operations include receiving one or more topics associated with the meeting. The operations include determining a ranking of the one or more topics based upon, at least in part, the one or more identified interests.

One or more of the following features may be included. The operations may include identifying a first set of interests associated with a first individual included in the plurality of participants. The operations may include identifying a second set of interests associated with a second individual included in the plurality of participants. The operations may include identifying a third set of common interests for the first individual and the second individual, based upon, at least in part, identifying an intersection of the first and second set of interests.

Identifying the one or more interests may be based upon, at least in part, one or more consumption activities associated with the one or more individuals. Identifying the one or more interests may be based upon, at least in part, profile information associated with the one or more individuals. Identifying the one or more interests may be based upon, at least in part, one or more social networking activities associated with the one or more individuals. Identifying the one or more interests may be based upon, at least in part, one or more publication activities associated with the one or more individuals. Identifying the one or more interests may be based upon, at least in part, chronological information associated with the one or more interests.

According to another aspect of the disclosure, a computing system includes one or more processor devices and one or more memory architectures coupled with the one or more processor devices. The one or more processor devices are configured to identify a plurality of participants in an electronic meeting. The one or more processor devices are configured identify one or more interest associated with one or more individuals included in the plurality of participants. The one or more processor devices are configured to receive one or more topics associated with the meeting. The one or more processor devices are configured to determine a ranking of the one or more topics based upon, at least in part, the one or more identified interests.

One or more of the following features may be included. The one or more processor devices may be configured to identify a first set of interests associated with a first individual included in the plurality of participants. The one or more processor devices may be configured to identify a second set of interests associated with a second individual included in the plurality of participants. The one or more processor devices may be configured to identify a third set of common interests for the first individual and the second individual, based upon, at least in part, identifying an intersection of the first and second set of interests.

Identifying the one or more interests may be based upon, at least in part, one or more consumption activities associated with the one or more individuals. Identifying the one or more interests may be based upon, at least in part, profile information associated with the one or more individuals. Identifying the one or more interests may be based upon, at least in part, one or more social networking activities associated with the one or more individuals. Identifying the one or more interests may be based upon, at least in part, chronological information associated with the one or more interests.

The details of one or more implementations are set forth in the accompanying drawings and the description below.

Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
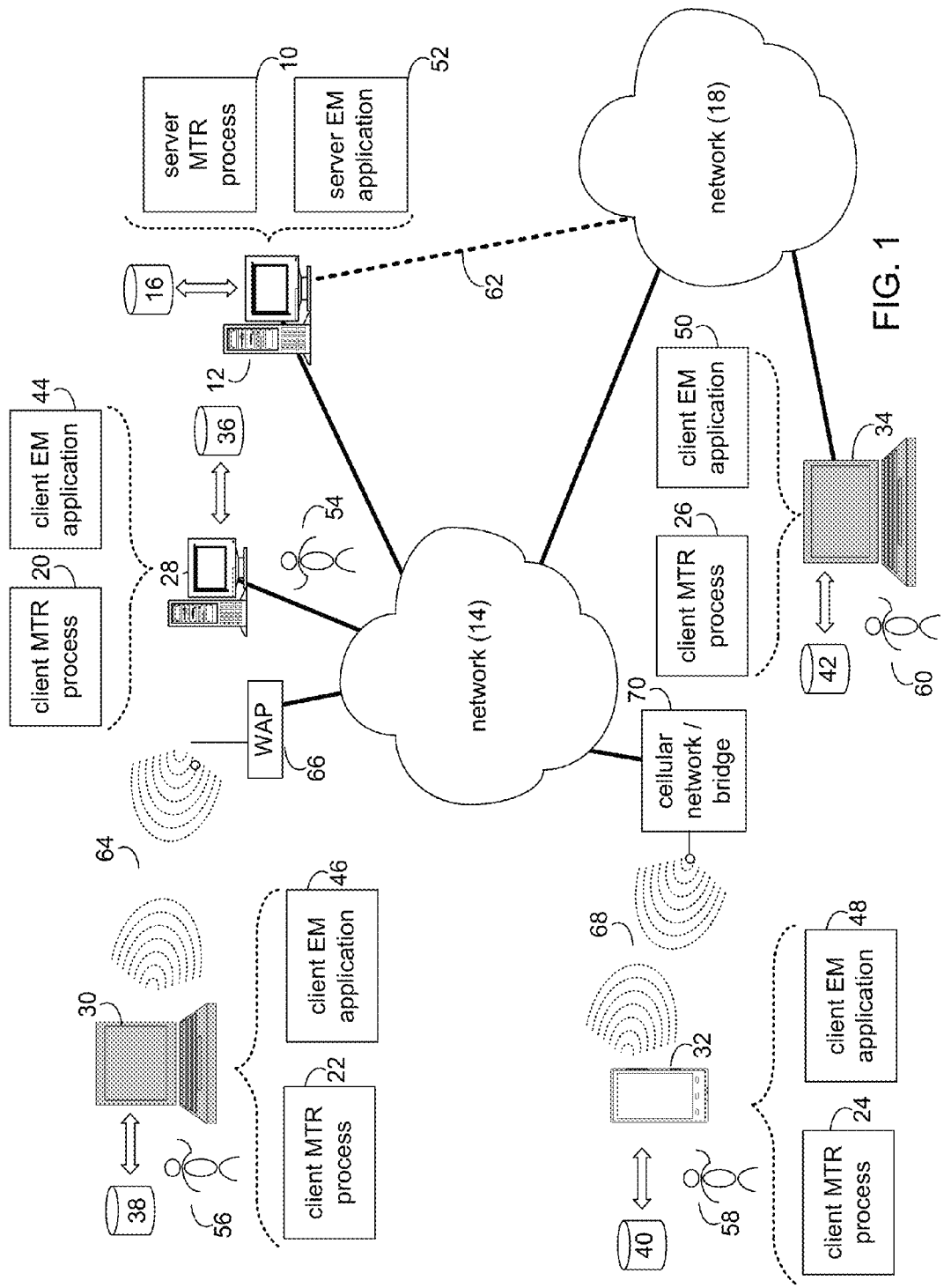
FIG. 1 is a diagrammatic view of a meeting topic ranking process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Individuals and groups of individuals may communicate with each other in electronic meetings (e.g., as facilitated by one or more electronic meeting applications or processes). As part of an electronic meeting (also referred to herein simply as a "meeting"), for example, an electronic meeting application may facilitate communication among individuals using telephones (e.g., landlines, cell phones, and so on), various other computing devices (e.g., text input devices, microphones, and so on), and other means. Individuals may communicate in an electronic meeting using voice, text, video, and/or various other communication types. In certain embodiments, individuals may utilize protocols such as voice over internet protocols ("VoIP"), which may facilitate voice and/or video communication using internet protocols. As such, it will be understood, as used herein, that "electronic meeting" may refer to communication among individuals using one or more of a variety of electronic communication means, including phone calls, instant messaging, chat rooms, text messaging, and so on. In certain embodiments, participants in an electronic meeting may be identified in various ways. For example, caller ID functionality may be utilized to identify participants calling into an electronic meeting bridge, IP addresses, screen names and other identifying information may be utilized to identify participants utilizing computing devices to participate in the meeting, and so on.

In order to enhance the functionality of electronic meetings, it may be useful to identify and/or categorize the content of discussions and other interactions occurring during the electronic meeting (e.g., so that such identified content may be presented to meeting participants and/or other individuals in various ways, along with related information or links to information). For example, voice recognition software may be utilized to identify keywords and/or topics of discussion for a particular electronic meeting, which keywords/topics may be categorized and/or otherwise organized for browsing and/or searching by meeting participants and/or other individuals, and may be presented along with additional related information and/or links to additional related information. Identified content may be usefully presented in a variety of levels of detail. For example, in certain embodiments, identified content may be parsed to identify various general topics, which may be presented to participants in a meeting (and/or other individuals) along with, for example, links to related information (e.g., related corporate knowledge bases, transcripts from other meeting addressing the same topic, and so on). In certain embodiments, for example, electronic meetings may be recorded, or otherwise memorialized. For example, audible electronic meeting interactions may be recorded, e.g., such that the audio of the electronic meeting may be listened to by a meeting participant, or by another individual, at a later point in time. In a similar manner, text, video, and/or graphical components of an electronic meeting may similarly be recorded and/or stored (e.g., on any suitable datastore) to enable a meeting participant, and/or another individual to review, search, etc. the contents of the electronic meeting. In some embodiments, topical information may be associated with corresponding portions of such electronic meeting records. As such, for example, presenting such topical information to meeting participants (and/or other individuals) may facilitate those participants readily accessing relevant portions of such stored records.

In certain embodiments, participants in a meeting may discuss topics that may have little relevance to the focus of the meeting and/or the interests of the other participants. For example, in a meeting focused on a corporate research project various participants may briefly discuss extraneous issues such as a new restaurant nearby their corporate campus, a camping trip one participant took the past weekend, and so on. Unfiltered voice recognition (and/or other topic identification means), however, may not effectively distinguish between these more extraneous topics (e.g., restaurants, vacation experiences, and so on) and more key foci of a meeting (e.g., the research project regarding which the meeting has been organized). Accordingly, it may be useful to implement a process (or application, and so on) that may assist in identifying the more relevant topics (e.g., with respect to the meeting, a set of participants, and so on) that were discussed in a particular meeting from among a larger list/index of topics identified using various known means (e.g., voice recognition, and so on). A meeting topic ranking ("MTR") process (or application) may provide this and/or various other functionality.

Referring now to FIG. 1, an MTR process may be coupled to a computer or computer network. For example, server MTR process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server MTR process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client MTR processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client MTR processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the MTR process may be a server-side process (e.g., which may be implemented via server MTR process 10), in which all of the functionality of the MTR process may be executed on a server computer (e.g., server computer 12). In an embodiment, the MTR process may be a client-side process (e.g., which may be implemented via one or more of client MTR processes 20, 22, 24, 26), in which all of the functionality of the MTR process may be executed on a client computing device (e.g., one or more of client electronic devices 28, 30, 32, 34). In an embodiment, the MTR process may be a hybrid server-client process (e.g., which may be implemented by server MTR process 10 and one or more of client MTR processes 20, 22, 24, 26), in which at least a portion of the functionality of the MTR process may be implemented via server computer 12 and at least a portion of the functionality of the MTR process may be implemented via one or more client computing devices (e.g., one or more of client electronic devices 28, 30, 32, 34).

In certain embodiments, an MTR process may be a stand-alone process. In certain embodiments, an MTR process may operate as part of, or in conjunction with, one or more other processes and/or may include one or more other processes. For example, in certain embodiments, an MTR process may be included in (or may operate in conjunction with) a electronic meeting ("EM") application (or process), which may generally facilitate electronic communication among multiple participants in an electronic meeting. For example, an EM application may facilitate voice communication (including, for example, through VoIP functionality), text communication, video communication, and so on among participants in an electronic meeting. In certain embodiments, an EM application (and/or an MTR application) may be part of and/or may interoperate with a social networking application (or process) (not shown), which may provide various types of social networking functionality.

An EM application (or process) may operate (and/or reside) on a client device (e.g., client EM application 44, operating on client electronic device 28; client application EM 46, operating on client electronic device 30; client EM application 48, operating on client electronic device 32; or client EM application 50, operating on client electronic device 34). A client MTR process (e.g., client MTR process 20) or a server MTR process (e.g., server MTR process 10) may be in communication with a client EM application (e.g., client EM application 44) or may be part of a client EM application.

An EM application may additionally/alternatively operate (and/or reside) on a server device (e.g., server EM application 52, operating on server computer 12 or another server EM application (not shown), operating on another server computer (not shown)). A server MTR process (e.g., server MTR process 10) or a client MTR process (e.g., client MTR process 20) may be in communication with a server EM application (e.g., server EM application 52) or may be a part of a server EM application.

Users 54, 56, 58, 60 may access an MTR process in various ways. For example, these users may access server MTR process 10 directly through the device on which a client process (e.g., client MTR processes 20, 22, 24, 26) is executed, namely client electronic devices 28, 30, 32, 34. Users 54, 56, 58, 60 may access server MTR process 10 directly through network 14 and/or through secondary network 18. Further, server computer 12 (i.e., the computer that executes server MTR process 10) may be connected to network 14 through secondary network 18, as illustrated with phantom link line 62. Users 54, 56, 58, 60 may also access a client or server EM application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client MTR process 20 will be described for illustrative purposes. It will be understood that client MTR process 20 may, for example, interact and/or communicate with a server MTR process such as server MTR process 10 and/or may be executed within one or more applications that allow for communication with other server and/or client MTR processes. This is not intended to be a limitation of this disclosure, as other configurations are possible (e.g., MTR process 20 may include stand-alone client processes and/or stand-alone server processes). For example, some implementations may include one or more of client MTR processes 22, 24, 26 or server MTR process 10 in place of or in addition to client MTR process 20.

Figure 2:
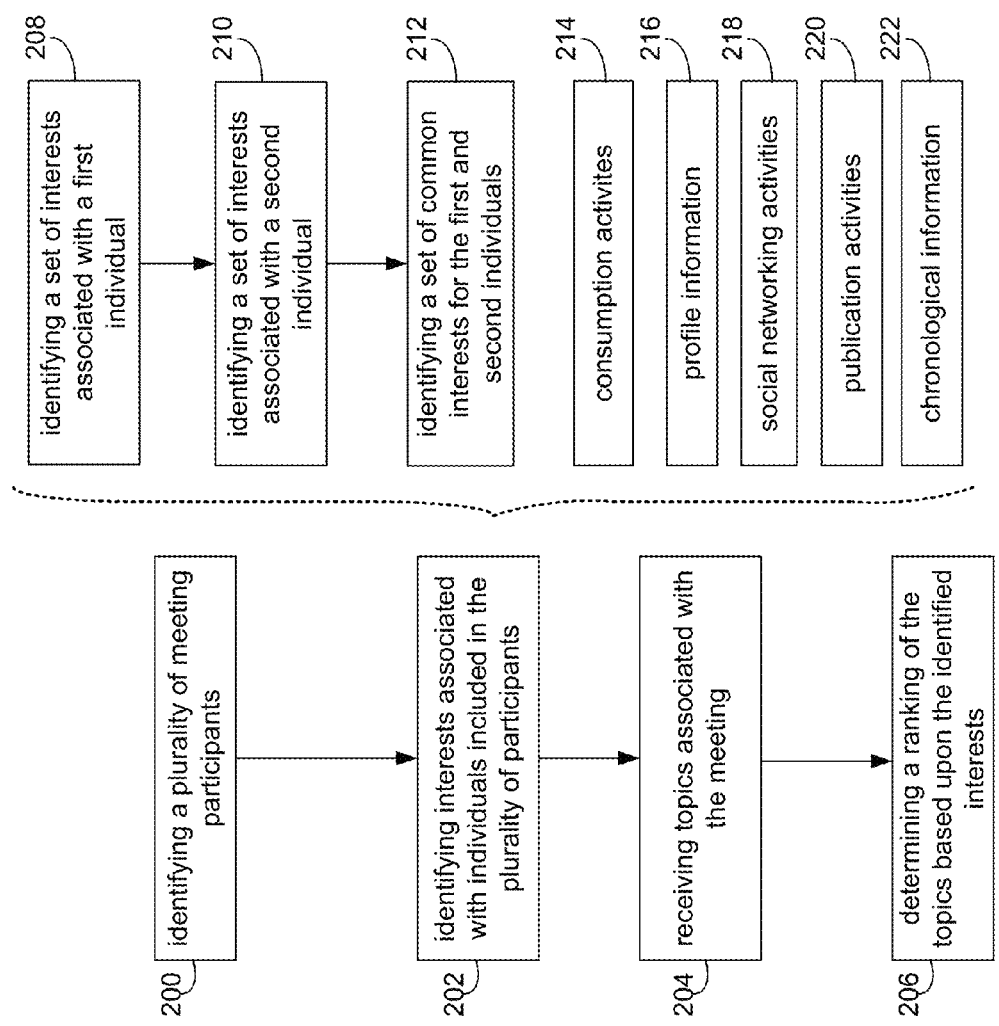
FIG. 2 is a flowchart of a process executed by the meeting topic ranking process of FIG. 1.

Referring now also to FIG. 2, there is shown a diagrammatic view of an example process that may be implemented by an MTR process, e.g., client MTR process 20. Client MTR process 20 may identify 200 a plurality of participants in an electronic meeting. As also noted above, participants in an electronic meeting may participate in the meeting using various means. For example, participants may call into a meeting using a call bridge and various telephonic devices, may utilize VoIP calling, may log into an online meeting room through a web-based or other service or application, and so on. Accordingly, MTR process 20 may identify 200 participants in an electronic meeting in various ways. For example, MTR process 20 may identify 200 participants using caller ID technology, IP address identification, participant self-identification (e.g., a participant entering the text of her name or another identifier, a participant speaking her name or another identifier, and so on), identification of participants' usernames/screen-names/aliases, and so on.

MTR process 20 may identify 202 one or more interests associated with one or more individuals included in the plurality of participants. For example, having identified 200 a participant in a meeting, MTR process 20 may identify interests (e.g., topics, areas of expertise, relevant projects and/or technology, and so on) that are associated with that participant. MTR process 20 may identify 202 interests associated with a meeting participant in a variety of ways, as will be discussed in greater detail below.

In certain embodiments, identifying 202 interests for meeting participants may occur in real time or quasi-real time (i.e., in such a way that a participant may perceive no—or only a minimal—lag or other delay in execution of various functionality). For example, as a participant is participating in an electronic meeting, MTR process 20 may identify 202, in real time and/or quasi-real time, interests associated with that participant from a variety of sources. In certain embodiments, identifying 202 interests for meeting participants may occur prior to the electronic meeting. For example, prior to the start of an electronic meeting, MTR process 20 may identify 202 various interests associated with a participant (e.g., a user registered as a participant with a particular EM application) from various sources and may store these interests as part of an MTR profile associated with the participant. In this way, for example, when the electronic meeting has started, MTR process 20 may identify 202 interests associated with a participant by retrieving the earlier-assembled profile for the participant, rather than actively assembling (and/or amending) a list of interests during the meeting. In certain embodiments, MTR process 20 may identify 202 interests in a combination of the above techniques. For example, MTR process 20 may utilize a pre-assembled list of interests for a meeting participant and may supplement or edit that list in real time (or quasi-real time) while the meeting is in progress.

MTR process 20 may receive 204 one or more topics associated with the meeting. For example, voice recognition software, contextual/syntactical/other analysis of text or other communications in the meeting, analysis of calendar information (e.g., meeting titles, list of attendees, and so on), and various other methods may be utilized to identify one or more topics of discussion in a meeting. For example, based upon a voice recognition application and contextual analysis, MTR process 20 may receive 204 information indicating that a particular meeting has covered topics including "Kung Pao Chicken," "Acoustic Echo Cancellation," "Laboratory Testing of Audio Technology," and so on. MTR process 20 may include topic identification processes (e.g., processes utilizing voice recognition technology) and/or may interoperate with another application or process (e.g., an EM application) that may provide topic identification functionality.

MTR process 20 may determine 206 a ranking of the one or more received 204 topics based upon, at least in part, the one or more identified 202 interests. For example, as noted above, discussion in a particular meeting may sometimes range widely and, as such, may include topics that may not be of high interest to all (or a relevant portion) of the participants in the meeting. For example, continuing the discussion above, while certain participants in a meeting are waiting for another participant to access a relevant document, they may engage in a conversation that is largely unrelated to the main focus (or foci) of the meeting—e.g., may discuss the quality of the Five-Spice Chicken at a nearby restaurant, despite the fact that the meeting is focused on test protocols for Acoustic Echo Cancellation. Nevertheless, voice recognition and/or other topic identification applications may still identify Five-Spice Chicken (and/or Chicken Dishes, Chinese Food, Local Restaurants, and so on) as a topic discussed at the meeting. Comparison of these topics with the collective interests of meeting participants, however, may indicate that these topics may be extraneous to the main focus (or foci) of the meeting and may therefore merit a lower priority in a presentation of discussed topics associated with the meeting. Accordingly, it may be useful for MTR process 20 to utilize the identified 202 interests of one or more of the meeting participants to rank (e.g., prioritize and/or otherwise order) the various received 204 topics in order to, for example, identify the topics that may be more relevant to a portion of the meeting participants.

For example, continuing the discussion above, if MTR process 20 has identified 202 that all participants in the Acoustic Echo Cancellation meeting share an interest in "Audio Engineering" (e.g., as indicated by trade associations, organizational titles and hierarchies, social networking activities, other online activities, and so on) and that only a few of the participants share an interest in Chinese cuisine (e.g., as indicated by blog or micro-blog postings), MTR process 20 may determine 206 that the received 204 topic of "Acoustic Echo Cancellation" may be of greater interest to the participants in the meeting than received 204 topic "Five-Spice Chicken" and may accordingly determine 206 that the former topic should be emphasized more than the latter in a presentation of topics to the participants and/or other individuals (e.g., in a meeting summary, a listing of meeting topics, an annotated meeting transcript, and so on).

In this way, for example, MTR process 20 may facilitate participants more easily focusing on relevant topics (e.g., when those topics are presented in a list with associated links to related information). For example, although discussion in a meeting may at times range widely (e.g., "Did you try the new bakery on Walnut St?" "I heard that you got a new puppy!" and so on), the participants may, in certain embodiments, be more interested (individually and/or collectively) in topics representing actual shared interest (e.g., which may, accordingly, represent certain key topics of the meeting), as well as additional information (and/or other features/activities) associated with those topics. By utilizing interest identification, MTR process 20 may facilitate identifying these topics of higher importance. Accordingly, for example, if various received 204 topics are presented to participants in a meeting (and/or other individuals) as an index for further information (e.g., are presented by an EM application associated with links to additional information related to the topics), MTR process 20 may facilitate effective ordered and/or other annotated presentation of such an index to meeting participants.

MTR process 20 may provide the determined 206 ranking information in a variety of ways. For example, if a list of received 204 topics is presented to participants in a meeting, MTR process 20 may provide ranking information as part of a pop-up window appearing based upon a particular use action (e.g., upon mouse-over of a particular topic), through annotation/curation of the list of topics (e.g., color coding, ordering of topics, presentation of a limited set of topics, and so on), and/or in various other ways. MTR process 20 may provide ranking information automatically (e.g., as part of an index of received 204 topics) and/or may provide ranking information in response to user input (e.g., upon request from a meeting participant).

MTR process 20 may determine 206 ranking of topics, based upon, at least in part, the identified 202 interests, in a variety of ways. For example, having identified 202 various sets of interests associated, respectively, with various participants in a meeting, MTR process 20 may determine an intersection of one or more of the various identified 202 sets of interests (i.e., may determine one or more interests that may be shared among multiple meeting participants). Such shared interests may, for example, be more likely to be of relevance to participants in the meeting (e.g., because individuals may tend, in a meeting, to discuss topics that are of mutual interest with greater frequency than topics that are not associated with a shared interest). Accordingly, in certain embodiments, it may be useful for MTR process 20 to determine 206 a higher ranking for topics associated with shared interests than for topics not associated with shared interests. Similarly, topics associated with interests that are shared among a larger number of meeting participants may be determined 206 to have a higher ranking than topics associated with less extensively shared interests. For example, if two participants of a meeting share an interest in Thoroughbred Horse Breeding and seven meeting participants in the meeting share an interest in Community Government, topics discussed in the meeting that relate to neighborhood beautification may be determined 206 to have a higher ranking than topics relating to the Kentucky Derby. It will be understood that various other factors may also be considered in determining 206 ranking, such as, for example, the frequency of occurrence of certain topics (or amount of time spent discussing those topics), meeting information (e.g., meeting title, invitee lists, meeting location, and so on), and so on.

In certain embodiments, MTR process 20 may determine 206 ranking in other ways as well. In an embodiment, as noted above, MTR process 20 may filter identified 202 interests based upon other information associated with a meeting (e.g., a meeting title, location, purpose, attendee list, and so on), which may indicate the relative importance of various topics. For example, if a meeting title (e.g., as specified in a calendar invitation to the meeting) indicates a particular meeting subject matter, MTR process 20 may filter identified 202 interests based upon that identified subject matter in order to more efficiently identify relevant subject matter and determine 206 a topic ranking. For example, although the majority of participants in a meeting may share an identified 202 interest in snowboarding, and snowboarding may have been discussed during the meeting (i.e., may have been identified as a meeting topic by a voice recognition application), the fact that the meeting title is "Financial Projections for 3Q 2013" may indicate that snowboarding topics merit a lower determined 206 ranking than topics associated with financial projections. As such, for example, despite snowboarding being identified as a topic of discussion and a shared interest of meeting participants, MTR process 20 may determine 206 a higher ranking for topics associated with identified 202 shared interests that relate to finance and financial issues, because of the information included in the meeting title.

MTR process 20 may determine 206 ranking of received 204 topics based upon, at least in part, various identified 202 interests. In certain embodiments, however, such identified 202 interests may not always exactly correspond, respectively, with such received 204 topics. For example, an identified 202 interest may be "Hydrological Engineering" and a received 204 topic may be "Wave Dynamics in Baja Calif." Although, therefore, the subject matter of this interest and this topic may be highly similar, the categories describing the interest and topic may be distinct. As such, as part of such ranking 206 topics, for example, MTR process 20 may associate certain identified 202 interests with certain received 204 topics in a variety of ways. In certain embodiments, for example, MTR process 20 may employ semantic, contextual and/or other analysis to associate interests and topics. For example, semantic analysis may indicate that the identified 202 interest in "Hydrological Engineering" may correspond with the received 204 topic of "Wave Dynamics in Baja Calif.," even though the topic/interest titles are different. In certain embodiments, MTR process 20 may additionally/alternatively utilize one or more indices of associations (i.e., a pre-configured index mapping various interests and/or interest categories to various topics and/or topic categories) in order to associate interests and topics. In certain embodiments, MTR process 20 may additionally/alternatively utilize other means, such as receiving user input (e.g., from a participant or administrator) related to categorizing a received 204 topic and/or an identified 202 interest.

As also noted above, MTR process 20 may identify 202 interests associated with meeting participants in a variety of ways. For example, in certain embodiments, MTR process 20 may identify 202 interests based upon, at least in part, identifying consumption activities 214. Consumption activities 214 may be associated with a particular participant in a meeting and may include various types of activities through which such a participant consumes content (e.g., electronic content such as files, webpages, microblog postings, and so on). For example, a participant's consumption activities 214 may include the participant viewing particular webpages, subscribing to particular RSS feeds or other publications, downloading (or otherwise obtaining) particular media (e.g., e-books, articles, videos, audio files, and so on), following particular blogs and/or micro-blogs, and so on. These and other consumption activities 214 may be utilized to identify 202 interests in a variety of ways. For example, if a participant in a meeting subscribes to an RSS feed relating to Grizzly Bears of Yellowstone, MTR process 20 may identify 202 interests for such a participant to include "wildlife," "conservation," "grizzly bears," "Yellowstone," "national parks," and so on.

In certain embodiments, MTR process 20 may identify 202 interest based upon, at least in part, identifying profile information 216 associated with one or more participants in an electronic meeting. Profile information 216 may include information associated with, for example, social networking profiles, memberships in various groups or associations, corporate directory profile information (e.g., contact information, job title, rank in organizational hierarchy, location, division, project groups, associates, teams, and so on), tags applied to the participant and/or the participant's online activities (e.g., tags of posts made by the user to a blog, a micro-blog, a social networking site, and so on), and various other profiles. These and other types of profile information 216 may be utilized to identify 202 interests in a variety of ways. For example, a corporate directory (and/or other profile) may indicate that a particular meeting participant works for the "Advanced Electronics Research" division of a corporation, within the "Microwave Ovens" division, and has participated in team projects including "Solar-Powered Microwaves." Accordingly, for example, MTR process 20 may identify 202 interests for this participant which may include "consumer electronics," "solar power," "electronics research and development," and so on. Similarly, a social networking profile may indicate that the participant belongs to a group entitled "Save Our Beaches" and has listed activities in the profile including "Wetland Clean-up Crew," and "Litter Patrol." Accordingly, MTR process 20 may identify 202 interests for the participant as including "environmentalism," "community beautification," "conservation," and so on.

In certain embodiments, MTR process 20 may identify 202 interests based upon, at least in part, identifying social networking activities 218 and/or other online activities associated with a meeting participant. Social networking activities 218 (and/or other online activities) may include, for example, utilizing links through a social networking service, viewing social networking (and/or other) pages or posts, ranking social networking (and/or other) pages or posts (e.g., by binary approval/disapproval indicators), association of the participant with various individuals/groups/pages/etc. on a social networking site (e.g., via the participant becoming a member in a particular social networking group, following a particular social networking individual or page, and so on), other consumption of social networking (and/or other) content using social networking applications, and so on. These and other types of social networking activities 218 (and/or other online activities) may be utilized to identify 202 interests in a variety of ways. For example, if a participant follows a social networking page title "Outdoor Cooking" and has indicated approval of posts to that page titled "Grilling with Hardwood Charcoal" and "Tasty Marinades for Shrimp," MTR process 20 may identify 202 interest for that participant that may include "grilling," and "seafood."

In certain embodiments, MTR process 20 may identify 202 interests based upon, at least in part, identifying publication activities 220. Publication activities 220 may be associated with a participant in a meeting and may include, for example, publication of micro-blog posts, text-based chat (and/or other) transcripts, emails, patents, webpages, papers, books, e-books, and so on. (It will be understood that "publication," as used herein, may refer to publication of content to a limited audience as well as publication to the public in general. For example, an email may be "published" by its author by virtue of being sent to a recipient, a portion of a text-based chat transcript may be "published" to other participants in an ongoing electronic chat session when transmitted to those participants as part of the ongoing session, and so on.) These and other types of publication activities 220 may be utilized to identify 202 interests in a variety of ways. For example, if a participant in an electronic meeting has published a variety of patents relating to automated testing of software applications, MTR process 20 may identify 202 interests for that participant that may include "software engineering," "tools for automated testing," and so on.

As also noted above, it will be understood that, in certain embodiments, not all interests identified 202 by MTR process 20 may be relevant to a particular meeting (and/or various identified 202 interests may be more relevant to a particular meeting than other identified 202 interests). For example, if a meeting has been scheduled to address the issue of "Subsea Hydrate Formation" (as determined, for example, based upon a calendar invitation associated with the meeting, a voice recognition application, and/or in various other ways), semantic (and/or other) analysis may indicate that interests relating to "hydrocarbon extraction and delivery" may be more relevant to the meeting than interests relating to peripheral topics such as "home gardening," "19th century French architecture," and so on. As such, for example, MTR process 20 may weight certain identified 202 interests more heavily than others in determining 206 a ranking of topics for a particular meeting. For example, continuing the discussion above, MTR process 20 may have received topics 204 from voice recognition analysis of the meeting that include references to rose cultivation, the use of stained glass windows, and so on as well as topics relating to subsea hydrates, and may have identified 202 that various participants in the meeting share interests related to these topics. However, MTR process 20 may, based upon the identified meeting title (and/or other information, such as a tendency of participants in the meeting to have advanced degrees in petroleum engineering, to belong to professional organizations associated with hydrocarbon recovery, and so on—as determined, for example, based upon profile information 216 and/or other sources of information), determine 206 a higher rank for topics that are more related to the focus of the meeting (e.g., topics such as "hydrate morphology") than for topics that may relate more strongly to other themes (e.g., topics such as "rose cultivation"). Additionally/alternatively, MTR process 20 may determine 206, for example, grouped rankings, whereby topics that may be both relevant to the focus of the meeting and related to identified 202 common interest may be presented separately (and/or otherwise distinguished) from topics that may relate to identified 202 common interests but not to the focus of the meeting. For example, MTR process 20 may provide a "Core" ranking relating to certain more relevant topics (e.g., topics identified as relating to the core focus of a meeting) and one or more "Ancillary" rankings relating to certain other topics (e.g., topics identified as having been discussed at the meeting but which may not relate to the meeting's core focus).

MTR process may additionally/alternatively identify 202 interests based upon, at least in part, identifying chronological information 222 associated with one or more other characteristics or information associated with a participant (e.g., other identified 202 interests, or various factors informing identification 202 of such interests). For example, for a particular participant in an electronic meeting, the pattern of the participant's publication activities 220, consumption activities 214, social networking activities 218, profile information 216, and so on may change over time. For example, based upon the participant changing jobs, earning advanced degrees, being assigned to a different project team, and so on, the participant may change the focus of her publication activities 220, consumption activities 214, and social networking activities 218, may change her profile information 216, and so on. Accordingly, for example, although a participant's past activities may have largely focused on certain interests (e.g., automated testing of software applications) a participant's more recent activities may largely focus on different interests (e.g., secure encryption of financial data). As such, MTR process 20 may utilize chronological information 222 (i.e., in this case, the change in activities of the participant over time) to identify 202 more relevant interests for a current (and/or other) meeting.

Figure 3:
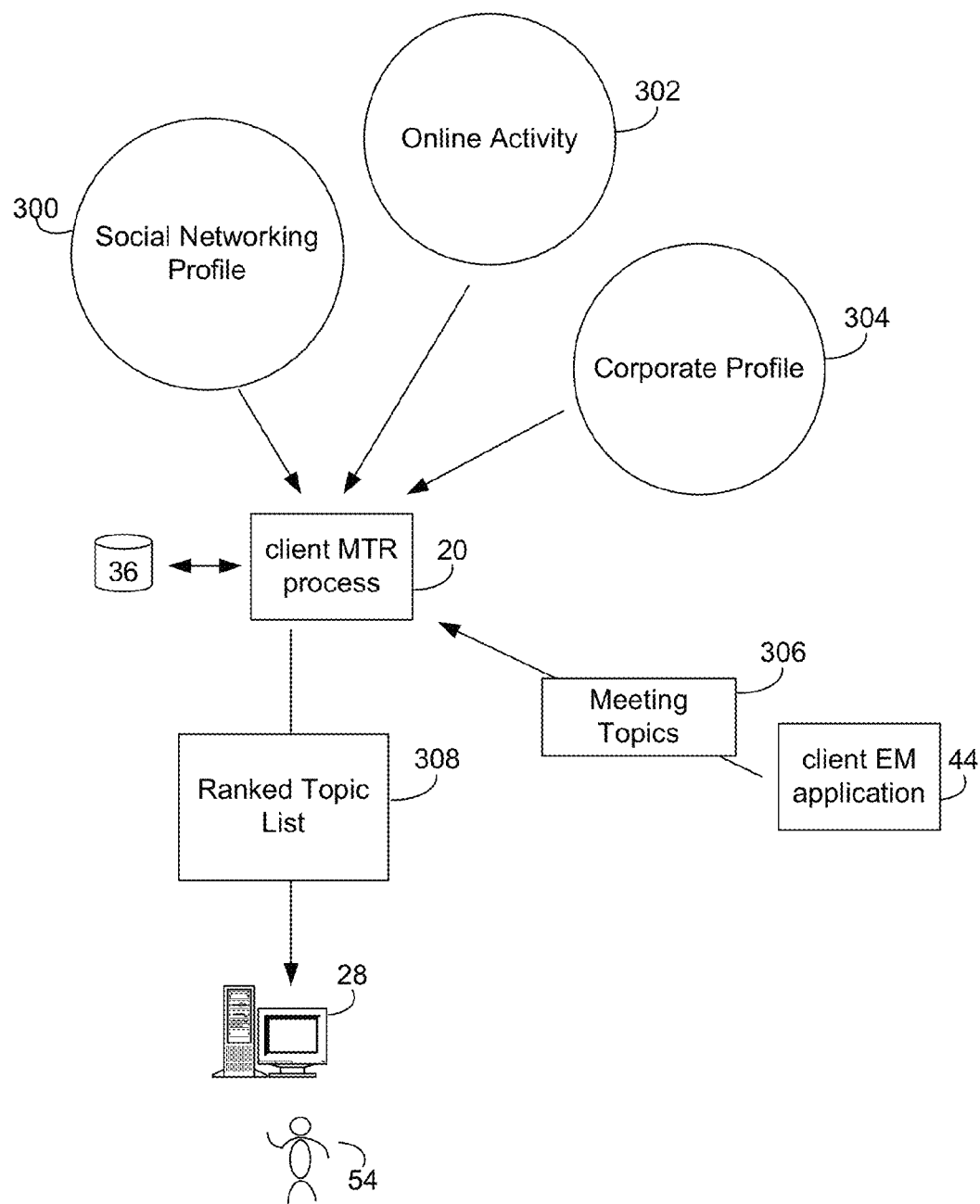
FIG. 3 is a diagrammatic view of an aspect of the meeting topic ranking process of FIG. 1.

Referring now also to FIG. 3, an example implementation of an aspect of MTR process 20 is depicted, for an electronic meeting (e.g., a conference call) in which user 54 is a participant. As also noted above, in order to determine 206 a ranking of received 204 topics for the electronic meeting, MTR process 20 may, for example, identify 202 interests for various participants in the meeting (including, e.g., user 54) based upon various sources of information, such as social networking profile 300, online activity 302, and corporate profile 304, which may be associated with user 54 (and/or other participants or users). In certain embodiments, MTR process 20 may, for example, identify 202 such interests (and/or associated information, such as information relating to social networking profile 300, online activity 302, and corporate profile 304) in advance of the electronic meeting, and may store the identified 202 interests (and/or associated information) in storage device 36 (e.g., as a list of identified 202 interests).

Participant 54 may participate in the conference call (e.g., a VoIP call) utilizing EM application 44. Based upon, for example, a voice recognition application included in EM application 44, MTR process 20 may accordingly receive 204 list 306 of topics relating to the meeting. Utilizing the identified 202 interest information (e.g., as stored in storage device 36) regarding user 54 (and/or other participants in the meeting), MTR process 20 may then determine 206 a ranked topic list 308, which may be provided, for example, to computing device 28 for utilization by user 54. For example, MTR process 20 may provide to user 54, via computing device 28, an ordered list of relevant topics (e.g., with a rank determined 206 based upon identified 202 interests) which may include links to related information, references to portions of a transcript of the call, and so on.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
identifying, by one or more computing devices, a plurality of participants in an electronic meeting;
identifying, by the one or more computing devices, one or more interests associated with one or more individuals included in the plurality of participants in the electronic meeting, wherein identifying the one or more interests is based upon, at least in part, at least one of one or more consumption activities associated with the one or more individuals and one or more publication activities associated with the one or more individuals, and wherein identifying the one or more interests is further based upon, at least in part, identifying a first set of interests associated with a first individual included in the plurality of participants, identifying a second set of interests associated with a second individual included in the plurality of participants, and identifying a third set of common interests for the first individual and the second individual, based upon, at least in part, identifying an intersection of the first and second set of interests;
identifying, by the one or more computing devices, one or more activities associated with the plurality of participants in the electronic meeting, wherein the one or more activities result in the one or more identified interests changing over a period of time;
receiving, by the one or more computing devices, one or more topics associated with the electronic meeting based upon, at least in part, at least one of a voice recognition application and contextual analysis during the electronic meeting;
determining, by the one or more computing devices, a ranking of the one or more topics associated with the electronic meeting based upon, at least in part, the one or more identified interests and the one or more identified activities associated with the plurality of participants in the electronic meeting, including comparing the one or more topics with collective interests of the plurality of participants in the electronic meeting, wherein the ranking is further based upon, at least in part, a number of participants of the plurality of participants in the electronic meeting that share an interest of the one or more interests; and
providing, according to the ranking, the one or more topics associated with the electronic meeting to at least one participant of the plurality of participants in the electronic meeting.

2. The computer-implemented method of claim 1 wherein identifying the one or more interests is based upon, at least in part, profile information associated with the one or more individuals.

3. The computer-implemented method of claim 1 wherein identifying the one or more interests is based upon, at least in part, one or more social networking activities associated with the one or more individuals.

4. The computer-implemented method of claim 1 wherein determining the ranking is based upon, at least in part, chronological information associated with the one or more interests.

5. A computer program product residing on a non-transitory computer-readable storage medium having a plurality of instructions stored thereon, which, when executed by a processor, cause the processor to perform operations comprising:

identifying a plurality of participants in an electronic meeting;

identifying one or more interests associated with one or more individuals included in the plurality of participants in the electronic meeting, wherein identifying the one or more interests is based upon, at least in part, at least one of one or more consumption activities associated with the one or more individuals and one or more publication activities associated with the one or more individuals, and wherein identifying the one or more interests is further based upon, at least in part, identifying a first set of interests associated with a first individual included in the plurality of participants, identifying a second set of interests associated with a second individual included in the plurality of participants, and identifying a third set of common interests for the first individual and the second individual, based upon, at least in part, identifying an intersection of the first and second set of interests;

identifying one or more activities associated with the plurality of participants in the electronic meeting, wherein the one or more activities result in the one or more identified interests changing over a period of time;

receiving one or more topics associated with the electronic meeting based upon, at least in part, at least one of a voice recognition application and contextual analysis during the electronic meeting; and determining a ranking of the one or more topics associated with the electronic meeting based upon, at least in part, the one or more identified interests and the one or more identified activities associated with the plurality of participants in the electronic meeting, including comparing the one or more topics with collective interests of the plurality of participants in the electronic meeting, wherein the ranking is further based upon, at least in part, a number of participants of the plurality of participants in the electronic meeting that share an interest of the one or more interests; and providing, according to the ranking, the one or more topics associated with the electronic meeting to at least one participant of the plurality of participants in the electronic meeting.

6. The computer program product of claim 5 wherein identifying the one or more interests is based upon, at least in part, profile information associated with the one or more individuals.

7. The computer program product of claim 5 wherein identifying the one or more interests is based upon, at least in part, one or more social networking activities associated with the one or more individuals.

8. The computer program product of claim 5 wherein determining the ranking is based upon, at least in part, chronological information associated with the one or more interests.

9. A computer system comprising:
one or more processor devices; and
one or more memory architectures coupled with the one or more processor devices;
wherein the one or more processor devices are configured to:

identify a plurality of participants in an electronic meeting;

identify one or more interests associated with one or more individuals included in the plurality of participants in the electronic meeting, wherein identifying the one or more interests is based upon, at least in part, at least one of one or more consumption activities associated with the one or more individuals and one or more social networking activities associated with the one or more individuals, and wherein identifying the one or more interests is further based upon, at least in part, identifying a first set of interests associated with a first individual included in the plurality of participants, identifying a second set of interests associated with a second individual included in the plurality of participants, and identifying a third set of common interests for the first individual and the second individual, based upon, at least in part, identifying an intersection of the first and second set of interests;

identify one or more activities associated with the plurality of participants in the electronic meeting, wherein the one or more activities result in the one or more identified interests changing over a period of time;

receive one or more topics associated with the electronic meeting based upon, at least in part, at least one of a voice recognition application and contextual analysis during the electronic meeting; and determine a ranking of the one or more topics associated with the electronic meeting based upon, at least in part, the one or more identified interests and the one or more identified activities associated with the plurality of participants in the electronic meeting, including comparing the one or more topics with collective interests of the plurality of participants in the electronic meeting, wherein the ranking is further based upon, at least in part, a number of participants of the plurality of participants in the electronic meeting that share an interest of the one or more interests; and provide, according to the ranking, the one or more topics associated with the electronic meeting to at least one participant of the plurality of participants in the electronic meeting.

10. The computer system of claim 9 wherein identifying the one or more interests is based upon, at least in part, profile information associated with the one or more individuals.

11. The computer system of claim 9 wherein determining the ranking is based upon, at least in part, chronological information associated with the one or more interests.

* * * * *